(12) United States Patent
Dunsker et al.

(10) Patent No.: US 8,626,332 B2
(45) Date of Patent: Jan. 7, 2014

(54) METHODS AND APPARATUS FOR MANAGING LOCATION INFORMATION FOR MOVABLE OBJECTS

(71) Applicant: NCR Corporation, Duluth, GA (US)

(72) Inventors: Eric David Dunsker, Seymour, CT (US); Michael Alan Spaulding, Dayton, OH (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/721,639

(22) Filed: Dec. 20, 2012

(65) Prior Publication Data

US 2013/0105570 A1    May 2, 2013

Related U.S. Application Data

(62) Division of application No. 11/302,715, filed on Dec. 14, 2005, now Pat. No. 8,369,981.

(51) Int. Cl.
*G06F 7/00* (2006.01)

(52) U.S. Cl.
USPC .......................................................... 700/214

(58) Field of Classification Search
USPC ............................................ 700/228, 214, 213
See application file for complete search history.

(56) References Cited

U.S. PATENT DOCUMENTS 7,818,088 B2 * 10/2010 Andersen et al. ............. 700/213

* cited by examiner

*Primary Examiner* — Ramya Burgess
(74) *Attorney, Agent, or Firm* — Peter H. Priest; Paul W. Martin

(57) ABSTRACT

Systems and techniques for locating stored goods. A plurality of fixed contactless identification devices are deployed in an area. Each fixed device exhibits a fixed device identifier that can be read from a distance. Locations within the area are identified through mapping to combinations of fixed device identifiers detected at the location. In addition, a plurality of movable contactless identification devices are associated with goods to be stored and retrieved. Each movable device exhibits a movable device identifier, and movable contactless identification devices are located by identifying a combination of fixed device identifiers received when a movable device identifier is received. The location information may be used independently, or as a supplement to expected location information obtained through other means.

4 Claims, 4 Drawing Sheets

METHODS AND APPARATUS FOR MANAGING LOCATION INFORMATION FOR MOVABLE OBJECTS

RELATED APPLICATIONS

This application is a Divisional Application of, and claims priority to, U.S. application Ser. No. 11/302,715, filed Dec. 14, 2005, entitled "METHODS AND APPARATUS FOR MANAGING LOCATION INFORMATION FOR MOVABLE OBJECTS," which is hereby incorporated by reference herein in its entirety for all purposes. This application is also related to the following other Divisional Application of U.S. application Ser. No. 11/302,715, U.S. application Ser. No. 13/721,258.

FIELD OF THE INVENTION

The present invention relates generally to improvements to relatively efficient storage and retrieval of goods. More particularly, the invention relates to improved systems and techniques for use of electronic devices for providing identification information that can be detected at a distance and processing the identification information in order to manage location information for movable objects.

BACKGROUND OF THE INVENTION

Warehousing operations frequently involve stowage and retrieval of identified platforms or containers, with each platform or container being associated with identified goods placed or packed on the platform or stored in the container. One commonly used platform for stowage and retrieval of goods is a pallet. Identification of each of a plurality of pallets is stored and when goods are loaded onto the pallet, identification of these goods is associated with the stored identification of the pallet. When goods are removed from the pallet, the association of the goods with the pallet is also removed. In this way, tracking of the location of goods is accomplished by tracking of the locations of the pallets onto which the goods are loaded.

Records of locations of pallets are stored in a database. When a pallet is needed, a forklift or other retrieval and transporting device is dispatched to the expected location of the pallet. If the pallet is not in the expected location, a search must be conducted. In typical operations in a warehouse, retrieval and replacement of pallets is continually occurring. Therefore, placement of pallets in incorrect locations, or incorrect recording of locations of pallets, is likely to occur with some frequency so that considerable effort and expense must be devoted to correcting location information for pallets and finding and relocating incorrectly placed pallets. Even if substantial effort is devoted to maintaining proper records of locations of pallets and placing pallets in their proper locations, incorrect storage of pallets and incorrect recording of the locations of pallets is likely to occur.

Warehouse systems frequently employ bar codes to label pallets and locations in which pallets may be placed. Accurate management of pallet location information in such a system typically requires that a pallet label and a location label be scanned whenever a pallet is placed, retrieved, moved, or replaced. If scanning is neglected, or if a scan fails to read a pallet's bar code without the failure being noticed, location information will be incorrect. In addition, bar code systems do not in and of themselves provide easy and convenient notification to an operator when the operator is approaching a location from which a pallet is to be retrieved or to which a pallet is to be restored, and they do not serve to guide an operator to a location.

SUMMARY OF THE INVENTION

Among its several aspects, the present invention addresses such concerns by providing a system of fixed and movable contactless identification devices. Each of the fixed and movable contactless identification devices provides information uniquely identifying the device. The information can suitably be read at a distance and preferably does not need to be read along a line of sight. The information provided by a fixed device is conveniently referred to as a fixed device identifiers and the information provided by a movable device is conveniently referred to as a movable device identifier. Fixed devices need not differ from movable devices in design or programming, but the use of the terms "fixed" and "movable" provides a convenient way to distinguish the devices in terms of the ways they are deployed and used. Fixed devices are typically affixed to specific, immobile storage locations, such as a shelf or rack in a warehouse. Movable devices are affixed to movable objects, such as pallets. Thus, movable devices are movable because they are affixed to movable objects.

The fixed and movable contactless identification devices may be conveniently implemented as radiofrequency identification (RFID) tags, but any device capable of providing information that can be read at a distance without depending on line of sight, may be used. The fixed identification devices and movable identification devices can be read from a distance. In one embodiment of the invention, one of a plurality of fixed contactless identification devices is attached to each of a plurality of pallets. Each of the fixed contactless identification devices provides a fixed device identifier uniquely identifying the fixed device.

Each of the movable contactless identification devices is associated with a pallet or container used for the storage and retrieval of goods. Specific descriptions or identifications of goods are suitably associated with each pallet or container, so that the location of goods may be determined by locating the pallet or container with which the goods are associated. Fixed device identifier data associated with the fixed contactless identification devices is stored, for example in a database, and movable device identifier data associated with the movable devices is also stored. In addition, location information for the fixed contactless identification devices may also be stored in association with the fixed device identifiers.

Locations of the movable objects, such as pallets, are determined by detecting fixed device identifiers received at the same time that movable device identifiers associated with the movable objects are received. A locator may travel about a warehouse, for example, continuously receiving identification signals transmitted from fixed and movable contactless identification devices. At different locations, the locator will receive different combinations of device identifiers, because different combinations of fixed devices will be in range of the locator. In addition, different sequences of fixed device identifiers will be received as the locator moves along different paths. In one embodiment of the invention, the locations of the fixed contactless identification devices are more and more finely resolved as data accumulates, so that for most or all movable contactless identification devices, the location of the device, and the pallet to which it is affixed, can be determined through examination of the combination fixed device identifiers detected at the same time as movable device identifier transmitted by the movable contactless identification device, together with examination of a record of fixed device identifiers received by the locator.

Using information collected by receiving fixed device identifiers and movable device identifiers, the true locations of movable objects, such as pallets, associated with the movable device identifiers can be determined. The actual location information can be compared against stored expected location information to determine if a pallet is out of place. In addition, the locator can read movable contactless identification devices in its vicinity to detect when a designated contactless identification device, and therefore the pallet to which it is affixed, is in the vicinity of the locator, so that an operator can be alerted. Further, computed location information for the locator can be used in conjunction with location information for a desired pallet in order to identify a path to the pallet and present it to the user. The path can be monitored, and a new path computed and presented if a deviation from the original path occurs.

According to another aspect of the invention, the location information provided by use of the fixed device identifiers need not supply such a high degree of precision and is not depended on to provide location information for movable devices. Instead, the information provided by the fixed device identifiers may be processed to define zones. The zone in which a movable device identifier is detected may compared against expected location information obtained and stored through other means. For example, in a system involving storing and retrieval of pallets, each storage location for a pallet may be associated with a bar code, and each pallet may be associated with a bar code. Precise location information is obtained by reading of a location bar code and a pallet bar code from appropriate labels whenever a pallet is retrieved or stored. At the same time, information provided by the fixed and movable contactless identification devices is constantly being received and processed as warehouse operations proceed. The zone in which each movable device is detected is noted and compared with storage locations in the zone. If a movable device is found to be out of the zone including its designated storage location, a discrepancy is detected and noted. This detection and notation of discrepancies between actual and expected locations need not involve any operator action. In addition, a locator may be designed so that it is able to search for a movable contactless identifier. If a user goes to an expected location of a pallet and the pallet is not in its expected location, the user may direct an appropriately designed locator to indicate whether the movable contactless identification device can be detected within the range of the locator. Such a capability aids in searching for missing pallets, and can be performed whether or not a locator is used to collect information from fixed contactless identifiers and this information is used to generate location information.

A more complete understanding of the present invention, as well as further features and advantages of the invention, will be apparent from the following Detailed Description and the accompanying drawings.

DETAILED DESCRIPTION

Figure 1:
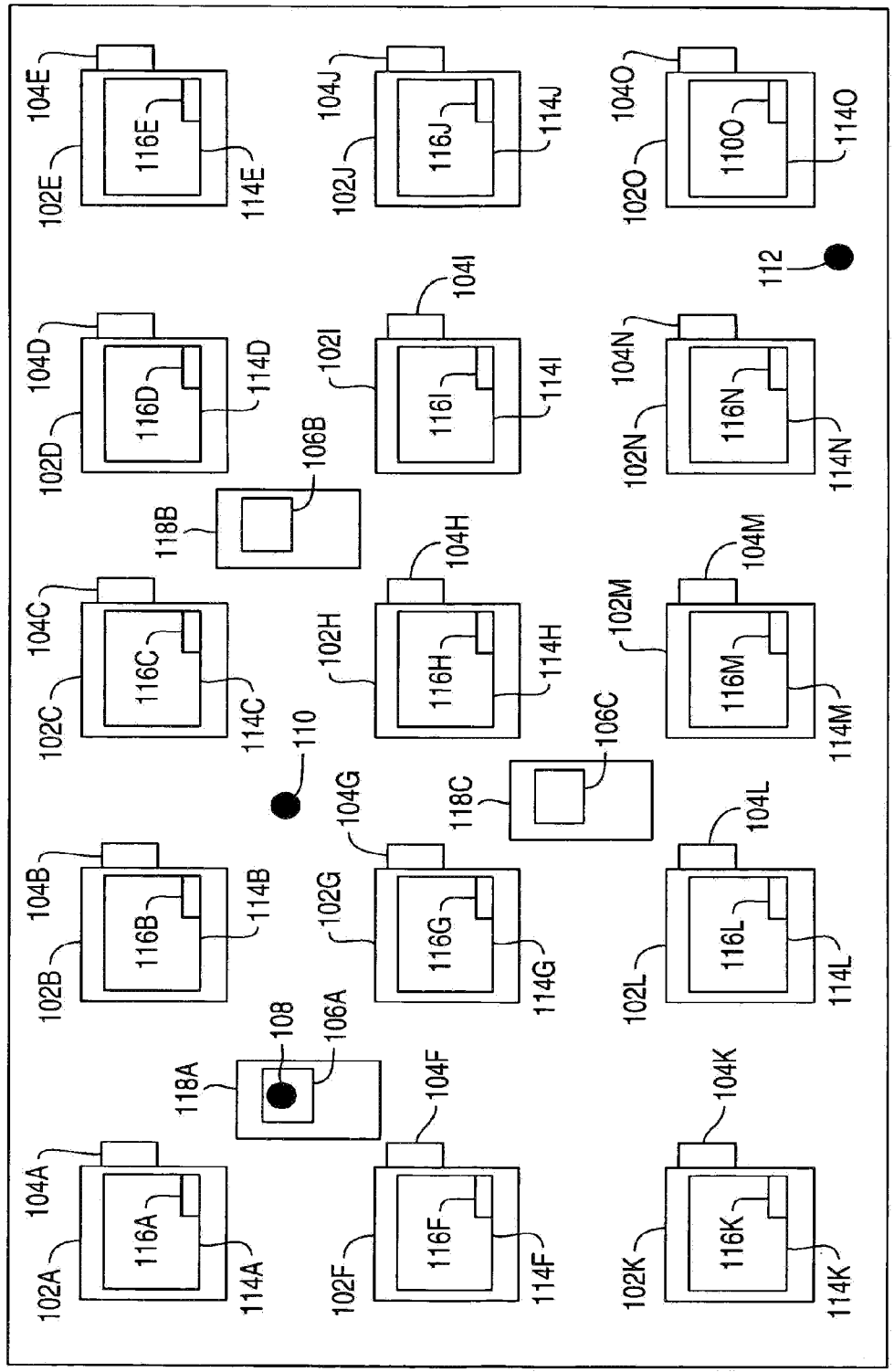
FIG. 1 illustrates an environment employing object location management according to an aspect of the present invention.

FIG. 1 illustrates an environment using movable object location management according to an aspect of the present invention. The exemplary environment shown is a warehouse 100. The warehouse 100 includes a plurality of pallet storage locations 102A-102O. The locations 102A-102O are identified by fixed contactless identification devices, implemented here in the form of fixed RFID tags 104A-104O, respectively. The fixed tags 104A-104O provide fixed device identifiers, for example, including identifying information such as a serial number. Fixed device identifiers from each of the fixed tags 104A-104O can be read by one or more locators such as the locators 106A-106C at some distance from the tag, with the distance being determined by factors such as the design of the tag, the environment in which the tags are used, the design, position and orientation of the locators 106A-106C and other factors. Only three locators 106A-106C are shown here, but it will be recognized that any number of locators may be used. The RFID tags illustrated here are passive tags responding to interrogations by the locators 106A-106C and providing information through reflected backscatter, for example. Such tags provide for low cost and low power consumption. However, it will be recognized that any device capable of emitting identifying information to be received at a distance may be used to implement the present invention.

The locators 106A-106C move through the warehouse 100 during the normal course of storage and retrieval of goods in the warehouse 100. The locators 106A-106C typically move in numerous different paths, and therefore can be expected to receive numerous different combinations of signals from various combinations of the fixed tags 104A-104O, as the locators 106A-106C move through positions in range of different combinations of tags. As will be discussed in greater detail below, as each of the locators 106A-106C detects tags and receives their identifiers, the locator transmits the combination of identifiers that are received at any particular time to a server (not shown here, but illustrated in FIG. 2 and discussed below), where the information can be analyzed in order to establish correlations between identifiers received from different combinations of the fixed tags 104A-104O and locations in the warehouse 100 where these combinations of identifiers will be detected.

For example, suppose that the locator 106A is placed at the location 108. At the location 108, the locator 106A receives signals from the fixed tags 104A, 104F, 104B and 104G. The locator 106A then travels to the location 110, where it receives fixed device identifiers from the fixed tags 104B, 104C, 104G and 104H, and then to the location 112, where it receives fixed device identifiers from the fixed tags 104L and 104M. The location of the locator 106A at any particular time can be isolated by identifying the combination of identifying signals that it detects at that time and comparing that combination of signals against a stored map or table of signal combinations versus locations. The locators 106B and 106C are typically moving along different paths at the same time and their positions may be determined in a similar way. The position of the locators 106A-106C may be computed with greater or lesser precision, depending on the design of the locators, the warehouse environment and the various tags. Depending on the precision of position computation for the locators 106A-106C and various other design choices and constraints, such as the desired degree of involvement by operators, the location information provided by the locators may be used for retrieval and location of goods or may be used to supplement location information collected in some other way, such as through reading of bar codes associated with storage locations.

Goods are stored in the warehouse 100, with an assembly of goods typically placed on a pallet, which is then stored in one of the locations 102A-102O. Pallets 114A-114O are illustrated here, with the pallets 114A-114O initially stored in the locations 102A-102O, respectively. Each of the pallets 114A-114O has a movable contactless identification device affixed thereto. Each movable contactless identification device transmits movable device identifiers including information uniquely identifying the device. In the exemplary embodiment illustrated here, each movable contactless identification device is implemented as an RFID tag, with the RFID tags 116A-116O affixed to the pallets 114A-114O, respectively. The tags 116A-116O may conveniently be referred to as pallet tags, to distinguish them from the fixed tags 104A-104O. As various ones of the pallets 114A-114O are retrieved from and stored in one or another of the storage locations 102A-102O, the movable device identifiers provided by the pallet tags 116A-116O can be detected, as well as various ones of the fixed tags 104A-104O. A plurality of transport devices, such as the forklifts 118A-118C, may be equipped with the locators 106A-106C, respectively, and in the course of operations the locators 106A-106C may be used to detect different ones of the pallet tags 116A-116O that come within range, as well as the fixed tags in their vicinity. Alternatively, one or more of the locators 106A-106C, or similar locators, may be handcarried by operators waking from one location to another, for example to retrieve goods to be carried by hand or on a manual transport device such as a cart. As a further alternative, the locators 106A-106C or similar locators may be used to guide the movement of automated or remotely controlled transport devices. Detection of pallet tags, together with location information determined for locators, may be used to help manage warehouse operations. For example, if an operator is replacing a pallet, the designated storage location of the pallet may be compared against the position of the locator carried by the operator. If the operator is nearing an incorrect storage location for the pallet, the operator may be advised of the correct storage location.

Detection of pallet tags need not be, and preferably is not, confined to detection of tags affixed to a pallet that is being worked with at a particular time. Instead, detection and noting of pallet tags, together with the combinations of fixed tags in their vicinity, is preferably carried out continuously, in order to perform a continuous automated audit of pallet locations.

Figure 2:
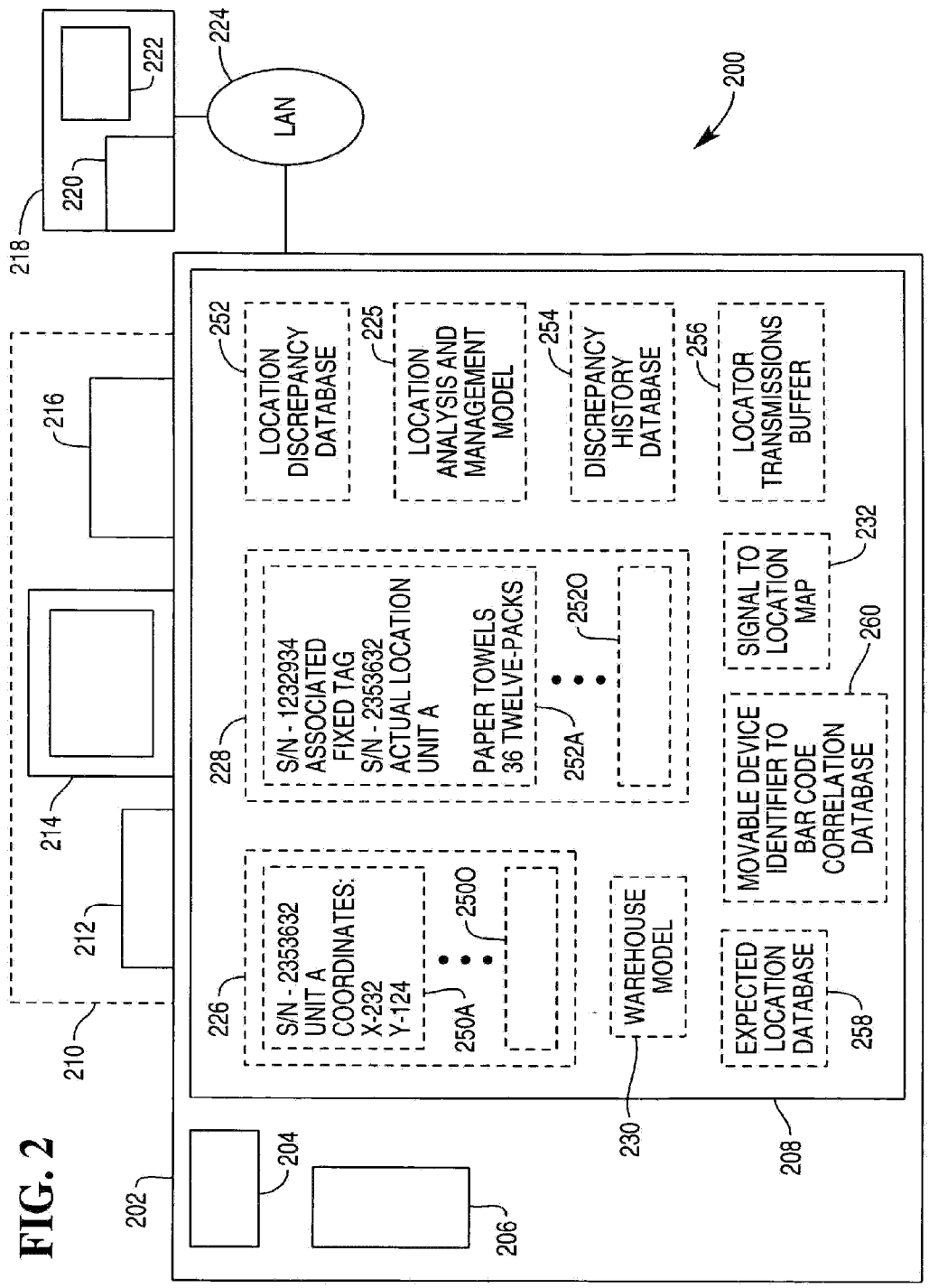
FIG. 2 illustrates a location information processing center according to an aspect of the present invention.

FIG. 2 illustrates a location information processing center 200 according to an aspect of the present invention. The center 200 may suitably be placed in the warehouse 100 of FIG. 1, but may alternatively be placed in a remote location, provided that a communication link is established allowing for communication between the center 200 and locators such as the locators 106A-106C of FIG. 1.

The center 200 preferably includes a data processing server 202 for storing and processing information used in management of operations carried out in the warehouse 100. The server 202 suitably includes a processor 204, high speed memory 206, and long term storage such as a hard drive 208. The server 202 includes an operator interface 210, comprising a keyboard 212, display 214 and printer 216. The server 202 is connected to a locator interface 218 for managing communication with the locators 106A-106C of FIG. 1 and other similar locators. The locator interface 218 includes a wired connector 220 to allow connection to a locator for uploading and downloading of information, and a wireless interface 222 to allow for wireless communication with locators, for example when locators are being used in operations in the warehouse 100. The locator interface 218 may be incorporated into or directly connected to the server 206, or may communicate with the server 206 through an intermediary connection, such as a local area network 224.

The server 202 hosts a location analysis and management module 225. The module 225 preferably takes the form of software residing on the hard drive 208, which is transferred into the high speed memory for use by the processor 204 as needed. The server 202 also hosts a number of databases 226-232, resident on the hard drive 208 and transferred into and out of the high speed memory 206 as needed. The databases 226-232 are used and maintained by the module 225. The databases 226-232 include a fixed tag database 226, a pallet tag database 228, a warehouse model 230 for use in determining relationships between signal combinations and physical locations in the warehouse, and a signal combination to location map 232.

The fixed tag database 226 stores information relating to the fixed tags, and comprises entries 250A . . . 250O for the fixed tags 104A-104O, respectively, of FIG. 1. Each of the entries 250A-250O includes a record of the identifier stored in the associated tag, along with location information identifying the tag's physical location. The entry 250A is shown in detail, and includes the tag's serial number and a set of location coordinates. The location coordinates are preferably also used by the model 230.

The pallet tag database 228 comprises entries 252A . . . 252O for the pallet tags 116A-116O, respectively, of FIG. 1. Each entry includes records for the identifier for the associated pallet tag, location data indicating the assigned location of the pallet associated with the tag, and identifiers for fixed tags in the vicinity of the assigned location of the pallet tag. Each entry may also include a record for an actual location of the pallet tag. If desired, the record may reflect the actual location of the pallet tag, whatever that location happens to be. Alternatively, the record of the actual location may be blank if there is no indication that the pallet is out of its assigned location, but may be populated with data indicating the actual location of the pallet if the pallet is found to be in a location other than the assigned location. Each entry also suitably includes a description of the items loaded onto the pallet. This description may be a general description of the type and quantity of goods. Particularly in the case of valuable items, however, the description may also include specific identification of goods, such as a serial number or numbers of an item or items. The entry 252A is shown in detail.

The warehouse model 230 includes records defining the layout of the warehouse 100, such as a list of designated pallet storage locations, sizes of storage locations and placement of tags in the storage locations. The model 230 also suitably includes information such as distances between locations, relative directions from one location to another, placement of corridors between storage locations and other information helping to define the use of space within the warehouse 100. The server 202 uses the warehouse model 230 to help interpret signals received from fixed tags. For example, the locator 106A may receive identifiers from three fixed tags. Analyzing the identifiers in light of the information of the warehouse model defining the distances between the storage locations to which the tags are affixed and the relative directions between storage locations helps to identify the position at which the combination of signals is received.

The signal combination to location map 232 is created and refined using information from the locators 106A-106C and similar locators. As a locator arrives at a known location, for example a location of a correctly placed pallet, the locator may transmit to the server 202 a notation of the location and of the signals received at the location. For example, the locator may allow for a user to note that he or she has arrived at a location and retrieved a pallet. The user may explicitly note that no discrepancy exists between the expected location and the actual location. Alternatively, an indication of a retrieval with no notation of a discrepancy may be presumed to indicate that no discrepancy exists. Whenever a locator sends an indication that it is at a known location along with the signals received at the location, the location analysis and management module 225 may use this information to refine the signal combination to location map 232.

Retrieval and storage of the pallets 114A-114O is accomplished by transport devices, for example, the forklifts 118A-118C of FIG. 1. A locator is suitably affixed to or carried on each transport device. In the present exemplary case, the locators 106A-106C are shown as being carried on the forklifts 118A-118C, respectively. Each of the locators is able to communicate with the server 202 as it moves. When a locator detects a signal from one of the fixed tags 104A-104N, the locator is able to transmit the identifier received from the tag and to continue to transmit the identifier so long as it is detected. If more than one identifier is detected, all identifiers may be transmitted as they are received. This information is used in conjunction with the fixed tag database 226 and the model 230 to construct and refine the signal map 232 on an ongoing basis. The signal map 232 associates locations with combinations of signals detected at the locations.

Particularly useful information is provided by one of the locators 106A-106C when the locator is at a known location. For example, if the forklift 118A is used to retrieve a pallet that is in its expected location, the location of the locator 106A can be known with certainty when the locator is at the location of the pallet. At that time, the locator 106A may transmit to the server 202 a notation of the location and of the signals received at the location. For example, the locator 106A may allow for a user to note that he or she has arrived at a location and retrieved a pallet. The user may explicitly note that no discrepancy exists between the expected location and the actual location. Alternatively, an indication that a pallet is being retrieved, with no notation of a discrepancy, may be presumed to indicate that no discrepancy exists.

Whenever a locator sends an indication that it is at a known location along with the signals received at the location, the location analysis and management module 225 may use this information in creating or refining the signal combination to location map 232. Once the signal to location map 232 is created, combinations of signals received can be used to identify the position of each of the locators 106A-106C. In addition, by tracking the combinations of signals received over time, the paths of the locators 106A-106C can be tracked. Tracking the path of the locators helps to resolve ambiguous position calculations.

The locators 106A-106C and other locators also receive signals from the pallet tags 116A-116O as the locators move around the warehouse 100. As each of the pallet tags 116A-116O is detected by a locator, the locator transmits to the server 202 the identifier of the detected pallet tag as well as all identifiers of fixed tags 104A-104O that are detected at the same time. If a signal from one fixed tag is lost and another is acquired, the transmission to the server is changed to reflect the new information. In this way, a locator is able to provide the server 202 with information showing which pallet tags are in the vicinity of which fixed tags.

Once the location of a pallet tag is identified, the location as detected may be compared against the location as entered in the pallet tag database 228. If a pallet is out of place, this fact, and the location of the pallet, may be noted and reported. For example, a location discrepancy database 252 may be compiled and stored. The database 252 may be examined and a report prepared periodically. Alternatively or in addition, the actual location of the pallet tag may be stored in the pallet tag database 228. Incorrect placements of pallets may be identified by surveying the database 228, comparing the actual location of a tag against its assigned location and reporting discrepancies As a further alternative, where storage of a pallet in a specific location is not critical, the assigned location record for a pallet may simply be updated to reflect the actual location of the pallet.

In addition, knowledge of the positions of locators and pallets may be used to guide operations. For example, an operator may be directed to the correct location of a pallet or advised when about to store a pallet in an incorrect location. In addition, the positions of locators may be monitored and this information used to prevent traffic conflicts by warning operators of traffic bottlenecks. In addition, knowledge of pallet locations, operator positions and positions of other operators and equipment may be used to provide routing instructions, guiding operators to locations based on considerations of minimum distances as well as traffic avoidance.

The location analysis and management module 225 is operative to examine one or more of the various databases 226-232 and 252 in order to perform analyses and provide information needed by users. For example, the module 225 may periodically examine the databases 228 and 252 to identify misplaced pallets, and prepare reports identifying misplaced pallets. The reports may suitably identify each misplaced pallet, as well as the actual and expected locations of the misplaced pallet.

If desired, the location discrepancy database 252 may note the time each discrepancy is discovered and store the time of discovery as part of a record of a discrepancy. For convenience, the discrepancy database 252 may be updated when discrepancies are corrected. However, in order to provide for an understanding of the operations of the warehouse 100, a discrepancy history database 254 may also be maintained. The discrepancy history database 254 includes a notation of each discovered discrepancy, the time of discovery, and the time of correction, if any. The module 225 may examine the discrepancy database 252 and the discrepancy history database 254 in order to generate reports of discrepancies and their corrections. A user may submit parameters defining a time period and section of the warehouse 100 to be covered by the report, and the module 225 examines the databases 252 and 254 in order to generate lists of discrepancies meeting those parameters.

The center 200 may also furnish information to guide users in locating misplaced or correctly placed pallets, or in identifying the correct location of a pallet to be stored. A user working at retrieving and replacing pallets may use the locator 106A to enter an identifier for a desired pallet. The locator 106 transmits the identifier to the center 200, where it is passed to the module 225. The module 225 searches the pallet database 228 and the discrepancy database 252 to find the location of the identified pallet. If the locator 106A has been transmitting its received signals to the center 200 while the user has been conducting operations, the center 200 may store these transmissions, for example in a locator transmissions buffer 256, and analyze the received signals using the signal to location table 232 in order to find the position of the locator 106A. The module 225 then uses the warehouse model 230 to determine a path between the location of the locator 106A and the location of the identified pallet and to transmit directions to the locator 106A. The module 225 may also determine the positions and paths of the locators 106B and 106C in order to take traffic considerations into account in generating directions.

Similarly, a user who retrieves a pallet can enter the pallet's identifier using the locator 106A, or another locator. The locator 106A transmits the identification of the pallet to the center 200, and the module 225 identifies the pallets storage location and computes and transmits directions to the storage location.

In addition or as an alternative to identification of pallets by a user, a list of pallets to be retrieved may be transmitted or otherwise provided to each of the locators 106A-106C. If desired, the same list may be transmitted to all locators, with the list being updated for all locators whenever a pallet is retrieved. When a pallet is found, a user may make an appropriate selection, such as pressing a "located" key to indicate that the identified pallet has been found. As will be discussed further below, the locators 106A-106C provide a user with a number of alternatives for navigating through a list.

The discussion above describes the system 100 as being used independently to compute locations of pallets and to provide location information to operators. However, the various tags and locators, and the server 202, may alternatively be used to supplement location information gathered and stored in other ways. For example, location of pallets may be tracked using bar coded labels on pallets and on pallet storage locations. In addition, a plurality of fixed contactless identifiers such as the fixed tags described above may be placed in an area, and movable contactless identifiers such as the movable tags described above may be affixed to each pallet. However, if information gathered from the fixed tags and movable tags is used as a supplemental source of information, precise location information need not be computed using information gathered from the fixed tags and the movable tags. In such a system, the server 202 may also host an expected location information database 258. In the present exemplary embodiment, the expected location information database 258 stores bar code information for each storage location. Bar code information for each storage location is stored in association with bar code information for a pallet stored in the location. The bar code information for the storage locations and pallets may be collected in conventional ways, such as manual reading of a storage location bar code and a pallet bar code by making appropriate scans with a bar code reader whenever a pallet is stored or retrieved. In this case, the server 202 also hosts a movable device identifier to bar code correlation database 260. The database 260 allows for easy retrieval of the bar code identifier for a pallet upon detection of the pallet's movable device identifier, or vice versa.

In order to use the location information provided by use and analysis of contactless identifiers as a supplement to another system of collecting location information, such as a bar code system, the pallet tag database 228 would not necessarily need to include precise location information, but might instead include a broader category of information for the location of each pallet tag, for example a zone in which the pallet tag was found. Alternatively, this information might not be stored in the pallet tag database 228, but might be stored instead in the location discrepancy database 252. In such a case, the server 202 would identify the zone in which a pallet tag was located whenever a report of detection of the movable device identifier associated with the tag was received. A comparison would be made against the expected location database 258. If the expected location of the pallet to which the tag was affixed was not included in the zone in which the tag was detected, the location discrepancy database 252 would be consulted. If the location discrepancy database did not already include the discrepancy, the database 252 would be updated.

Figure 3:
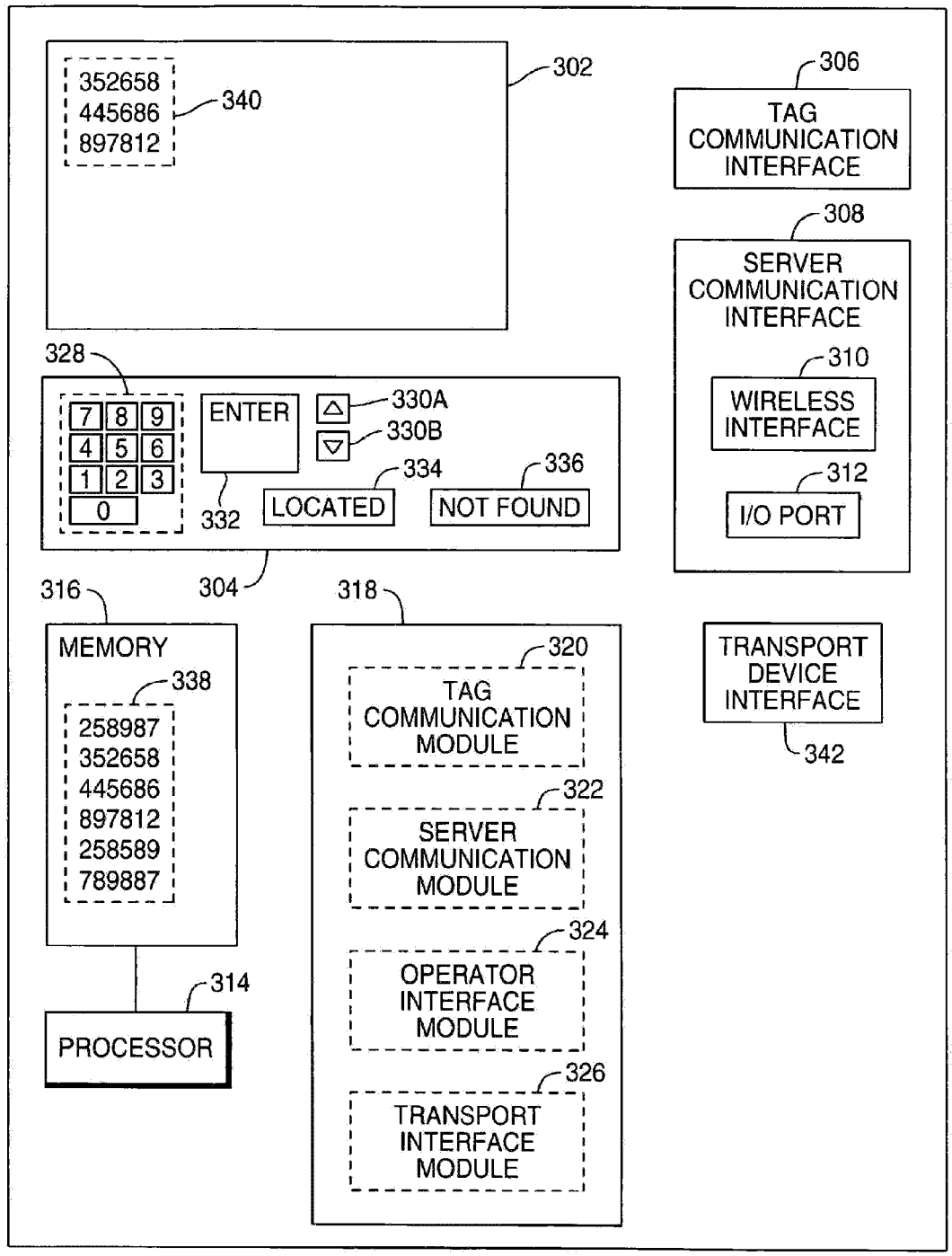
FIG. 3 illustrates a locator used for detecting signals used in determining location information and using signals and other information to locate items.

FIG. 3 illustrates additional details of the locator 106A. The locators 106B and 106C are not shown, but are similar. The locator 106A includes a display screen 302, a keypad 304, a tag communication interface 306 and a server communication interface 308. The server communication interface 308 includes a wireless interface 310 and an input/output port 312. The locator 106A also includes a processor 314, high speed memory 316 and long term storage 318. The long term storage hosts a tag communication module 320, a server communication module 322, an operator interface module 324 and a transport interface module 326, described in further detail below. The software modules 320, 322, 324 and 326 are transferred to the high speed memory 316 for execution by the processor 314 as needed.

The keypad 304 includes a number pad 328 and various control keys, such as cursor keys 330A and 330B, an "enter" key 332, a "located" key 334 and a "not found" key 336.

The locator 106A uses the tag communication interface 306 to receive identification messages from fixed tags such as the tags 104A, . . . , 104O and the pallet tags 116A, . . . , 116O. Communication suitably operates under the control of the tag communication module 320. The communication interface 306 may transmit query signals, for example, interrogation signals for passive RFID tags, allowing for the use of low cost passive RFID tags as the tags 104A, . . . , 104O and the tags 116A, . . . , 116O. The communication interface 306 receives identifying messages from the tags, which are then stored in memory 316 for analysis by the tag communication module 320. Once the analysis is performed, preparation and transmission of appropriate messages to the center 200 is directed by the server communication module 322, using the server communication interface 308. The server communication module 322 preferably directs transmission of received tag identifiers at suitable intervals, with the time that each tag identifier was received being sent to the center 200 of FIG. 2 as part of the transmission. As noted above, the module 225 of FIG. 2 uses information received from the locator 106 and other similar locators to determine the position of the locator 106A and of the pallet tags whose identifiers were received.

The locator 106A receives selections and identifiers of pallets to be retrieved, for example by entries made by a user employing the number pad 328 and control keys on the keypad 304, or transmissions received from the center 200. For example, a list of pallets to be retrieved may be transmitted through a wireless connection with the center 200, or may be downloaded to the locator 106A through a direct or mediated wired connection between the locator 106A and the center 200.

Once the identifier or identifiers are entered or received, a list 338 of the identifiers are stored in the memory 316. A list 340 of the entered identifiers is shown on the display 302. In the illustrated exemplary case, the list 338 is larger than the display 302 is designed to show, so the displayed list 340 includes only a portion of the stored list 328. A user may scroll up and down through the displayed list 340 as desired to see any identifier desired, and may select entries on the displayed list 340 using appropriate keys on the keypad 304. When a user has entered or selected a pallet to be retrieved, or when a pallet that is to be retrieved has otherwise been identified, the operator interface module 324 notes the identifier of the designated pallet, which is sent by the server communication module 322 to the center 200, with an indication that the pallet is to be retrieved. The center 200 identifies the location of the locator 106 using the tag identifiers that have been transmitted to the center 200, identifies the location of the identified pallet and transmits directions to the locator 106. The directions are received by the server communication module 322, where they are formatted and displayed on the display 302 under the control of the operator interface module 326.

When a pallet is retrieved, the user may indicate that the pallet has been retrieved by making an appropriate keypad entry. The user may press the "located" key 334 to direct transmission of an indication to the center 200 that the pallet has been retrieved. The indication is suitably accompanied by identifiers of the tags, particularly the fixed tags, from which signals are being received at the time the retrieval is indicated. Alternatively, if the pallet is not in the location to which the user has been directed, the user may press the "not found" key 336 to indicate that the pallet is not present at the location. The module 225 of the center 200 may then update the discrepancy database 252 and the pallet database 228 to reflect this information.

In addition or as an alternative to updating the discrepancy database 252 and the pallet database 228 the locator 106A may operate independently to search for a contactless identification device associated with a pallet that is not found in its expected location. When a user presses the "not found" key 336, the locator 106A may examine all device identifiers that are detected within range and may access the pallet database 228 in order to determine whether any device identifier matches the movable device identifier associated with the pallet that has not been found. If the device identifier is detected, the locator 106A may display a message or otherwise issue an alert that the missing pallet is in the vicinity. This mode of operation may be implemented in any way desired. For example, a search in the immediate vicinity of the expected location of the missing pallet may be conducted, or the search may continue until an alternative mode of operation is selected by the user. A continued search allows the user to move through the area in an attempt to detect the missing pallet, relying on the locator 106A to provide an indication when the pallet is in the vicinity and conducting a more focused search only when such an indication is received. Such a mode of operation may be particularly useful in cases in which information from contactless identification devices is used only as a supplement to location information generated in some other way, such as reading of bar codes. In such a case, if a user is directed to an expected storage location for a pallet and the pallet is not found, the user may use the locator 106A to search within its range for the contactless identification device associated with the missing pallet.

As an alternative or in addition to displaying identifiers and directions using the display 302, the locator 106A may include a transport device interface 342, operating under the control of the transport interface module 326. The transport device interface 342 is suitably connected to, or wirelessly communicates with, a mating interface built into an automated or remotely controlled transport device and provides information and commands needed by the device, and receives information provided by the device. The information may be wirelessly passed between the locator 106 and the center 200. For example, the locator 106 may receive travel directions from the center 200 describing a route to be followed to locate and retrieve a specific pallet. The locator 106 transmits motion commands to an automated transport device through the transport device interface 342.

Figure 4:
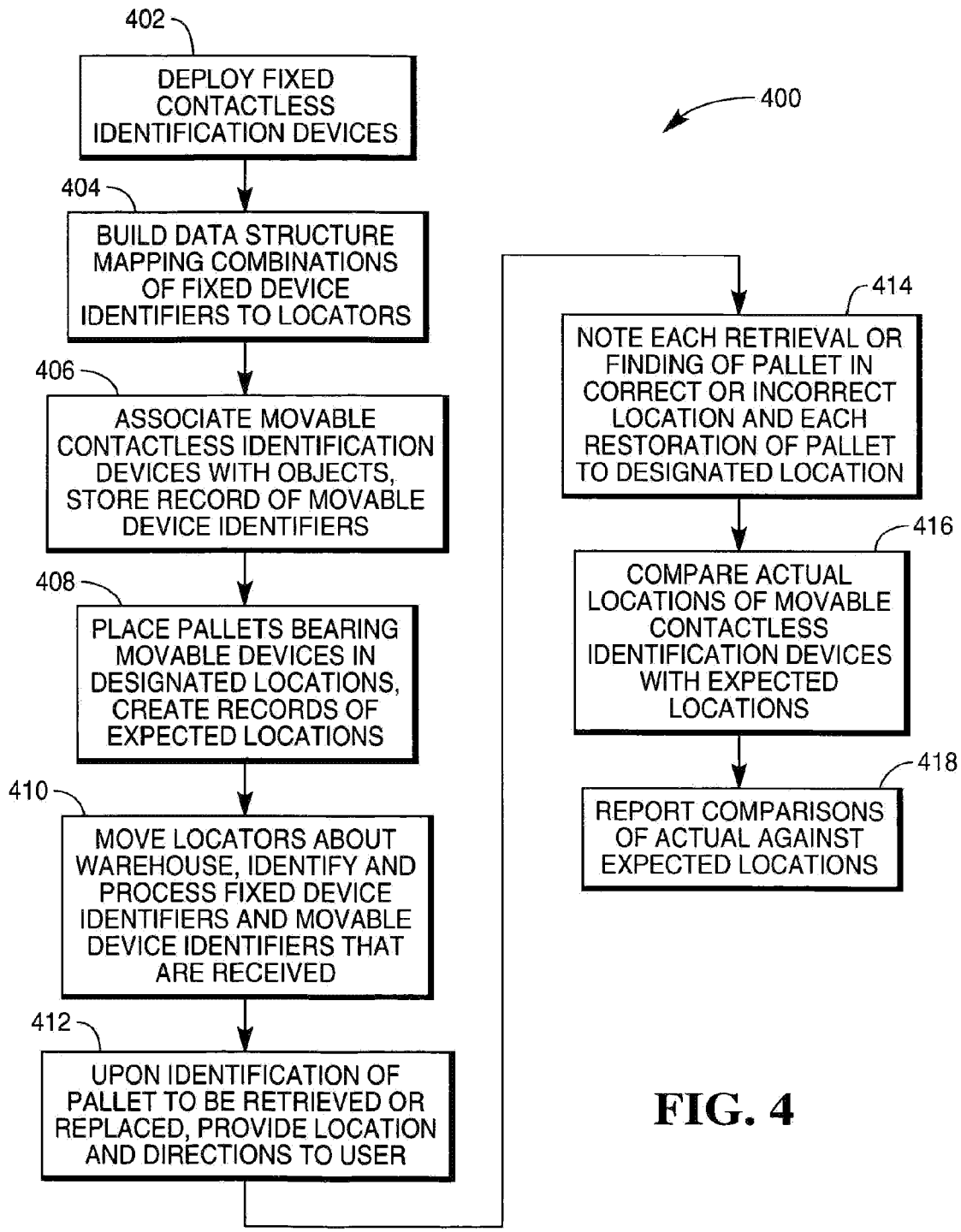
FIG. 4 illustrates a process of location determination according to an aspect of the present invention.

FIG. 4 illustrates the steps of a process 400 of goods location management according to an aspect of the present invention. The process 400 may suitably be carried out using a system such as the system 100 illustrated in FIG. 1. At step 402, a plurality of fixed contactless identification devices is deployed about an area, which for purposes of example will be assumed to be a warehouse. The contactless identification devices may suitably be low cost passive devices such as RFID tags, but any type of device capable of transmitting an identifying signal may be used. At step 404, data structure mapping occurs for combinations of fixed device identifiers emitted by the fixed devices against locations within the warehouse. The data structure may be built by moving a locator from one location to another and recording the fixed device identifiers that are received during movement of the locator, particularly when the locator is at a known location. Other ways of building the data structure may be contemplated, for example using known information about the warehouse in which the fixed contactless identification devices are deployed and the nature of the signals emitted by the identifiers to compute relationships between locations and signal combinations.

At step 406, a plurality of movable contactless identification devices are associated with movable objects to be stored in or retrieved from defined locations in the area. The movable contactless identification devices may be affixed to containers or platforms in or on which goods are to be placed. For example, a plurality of pallets may be used in a warehouse, with a movable contactless identification device affixed to each pallet. A record of each movable contactless identification device is stored in a database. For convenience, in the remainder of this discussion it will be assumed that the movable contactless identification devices are affixed to pallets.

At step 408, pallets bearing affixed movable contactless identification devices are placed in designated locations in the warehouse. Each pallet may be associated with a location in which it is placed, and therefore the movable contactless identification device is also associated with that location. In this way, a list of records is created in which designated pallets are expected to be found, with the presence of a pallet being detectable through a signal emitted by the movable contactless identification device associated with the pallet. At step 410, one or more locators is moved about the warehouse, for example during retrieval and storage of pallets. As each locator moves, it receives fixed device identifiers and the received fixed device identifiers are identified and processed to identify the location of the locator, and the path traveled by the locator, at different times. During the same time period, the locator receives signals from movable device identifiers emitted by movable contactless identification devices. When movable device identifier is received, the combination fixed device identifiers received at the same time is noted, as is the computed position of the locator. This information is analyzed to identify the location of the movable contactless identification device emitting the movable device identifier.

At step 412, upon identification of a pallet to be retrieved, the location of the pallet is provided to a user. Directions to the location may also be provided. Similarly, upon identification of a pallet to be restored to its location, identification of the location and directions to the location may also be provided.

At step 414, whenever a pallet is retrieved from or restored to its designated location, or when a pallet is found in an improper location or has failed to be found in its expected location, an indication of the retrieval, storage, or failure to find the pallet is noted and used to update position and comparison information. The actual location in which the pallet is found or replaced may be provided, particularly when the pallet is found outside of its designated location.

At step 416, the actual positions of movable identifiers, and the pallets with which they are associated, are compared to their expected positions and discrepancies noted. At step 418, comparisons of the actual position information with expected position information are reported as needed. For example, periodic reports of misplaced pallets may be prepared. In addition, evaluations of the proportion of misplaced pallets over a specified time within the entire warehouse or in a specified area of the warehouse may be generated.

While the present invention is disclosed in the context of a presently preferred embodiment, it will be recognized that a wide variety of implementations may be employed by persons of ordinary skill in the art consistent with the above discussion and the claims which follow below.

We claim:

1. A locator for use in locating objects having attached movable contactless identification devices, each movable contactless identification device exhibiting a movable device identifier, comprising:
   an identifier communication interface for reading the movable device identifiers;
   server communication interface for communicating with a data processing server storing records of the movable device identifiers; and
   a control unit for processing movable device identifiers read within the vicinity of the locator to determine if a specified movable device identifier is present in the vicinity of the locator;
   wherein the identifier communication interface also reads fixed device identifiers exhibited by fixed contactless identification devices, wherein the server communication interface also communicates with a data processing server storing records of the fixed device identifiers, and wherein the control unit is further operative to process movable device identifiers and fixed device identifiers received from movable contactless identification devices in the vicinity of the movable contactless identification devices from which movable device identifiers are received to identify locations of the movable contactless identification devices.

2. The locator of claim 1, wherein the locator transmits fixed device identifiers to the data processing server as the locator moves from one location to another.

3. The locator of claim 2, wherein the locator transmits to the data processing center fixed device identifiers read from fixed contactless identification devices in the vicinity of the movable devices from which movable device identifiers are received.

4. The locator of claim 3, wherein the locator transmits to the data processing server a selection designating an object to be located and receives direction information from the server, the direction information being based on a position of the locator computed from current and historical information showing fixed device identifiers received by the server and on a computed location of a movable contactless identification device affixed to the object.

* * * * *